Patented June 24, 1930

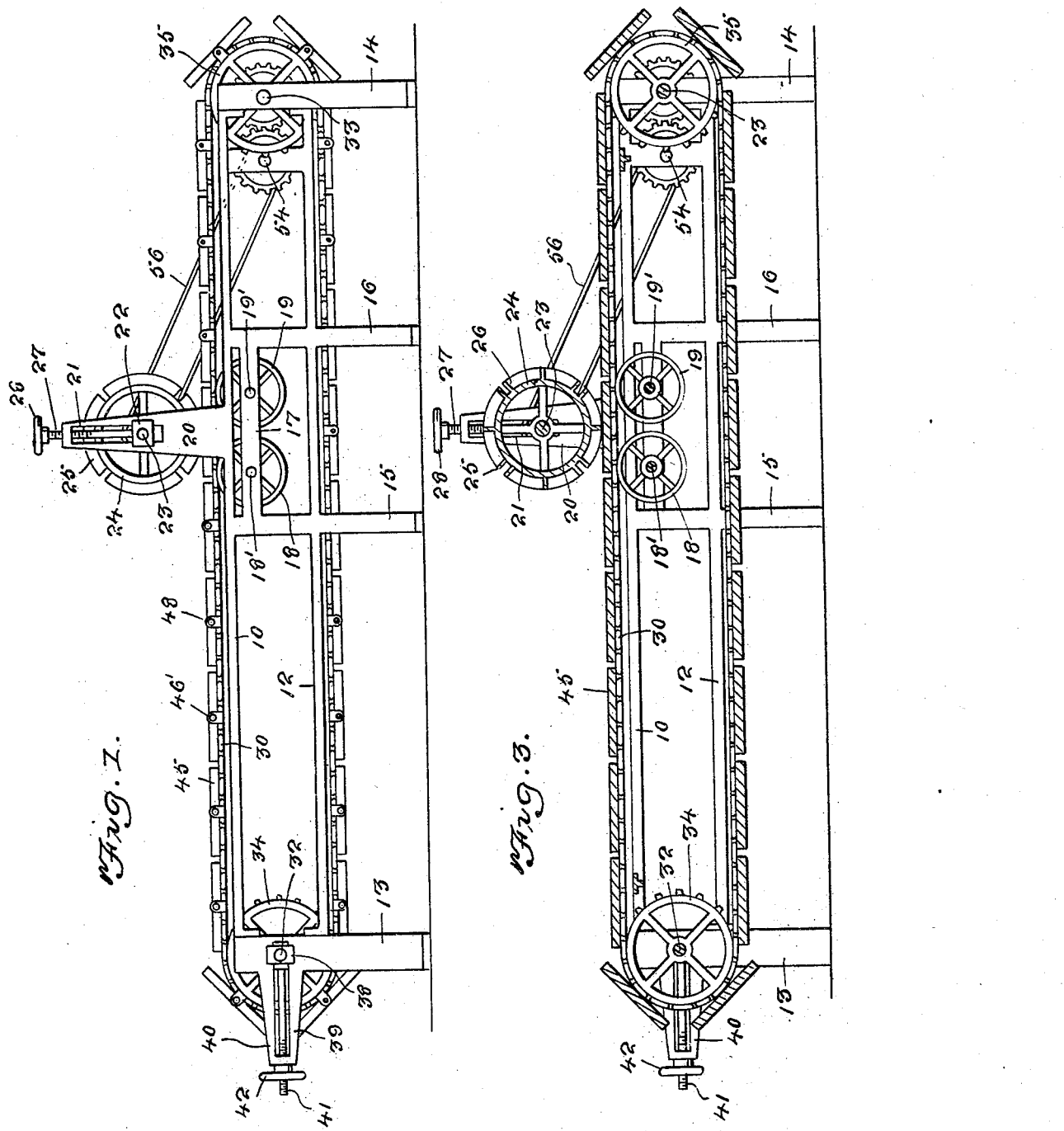

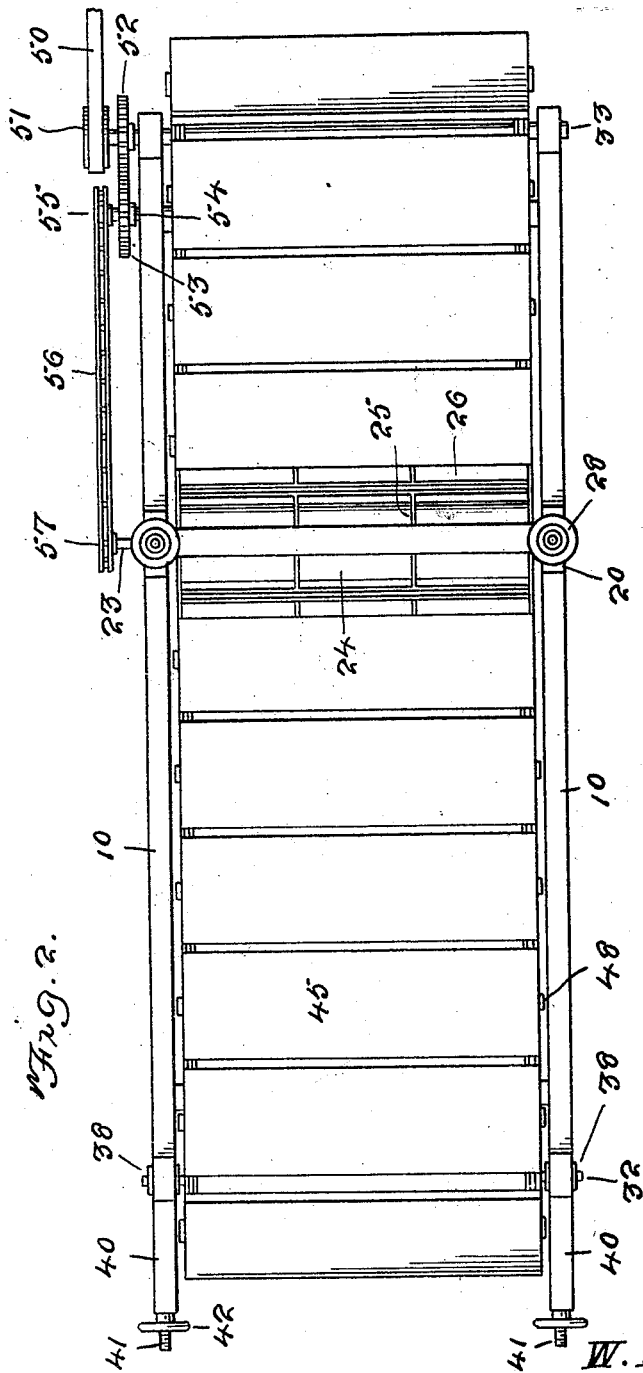

1,766,427

UNITED STATES PATENT OFFICE

WILLIAM H. CLELLAND, OF HUNTINGTON, WEST VIRGINIA

SHEET-GLASS-CUTTING MACHINE

Application filed January 30, 1928. Serial No. 250,531.

The object of this invention is to provide a machine for cutting sheet glass while hot, the device including rotary cutting means and traveling elements mounting a series of forms or size forms constructed and applied as indicated below.

A further object is to provide a machine of this kind with certain adjusting mechanism, also described in detail in the specification.

With the foregoing and other objects in view, the invention consists in the novel construction and arrangement of elements described, illustrated and claimed, it being understood that modifications may be made within the scope of the claim without departing from the spirit of the invention.

In the drawings forming part of this application,

Figure 1 is a view of the machine in side elevation.

Figure 2 is a view in top plan.

Figure 3 is a view in vertical longitudinal section.

The machine may include the upper and lower longitudinal frame members 10 and 12, and end supporting devices such as those designated 13 and 14, intermediate supporting devices being shown at 15 and 16. Between the upper portions of elements 15 and 16, on each side of the machine, are longitudinal bars 17 adapted to mount the rollers 18 and 19 directly beneath the cutting means.

Standards such as 20 each includes a vertically slotted portion 21 for the accommodation of a vertically sliding bearing block such as 22, the latter mounting the shaft 23 supporting the roller 24 which carries the shear elements. These elements include the circumferential cutting devices 25, and the longitudinal elements 26. The bearing blocks 22 are vertically adjustable by means of threaded devices, constituting rods or screws 27 controlled by hand wheels 28.

The rollers 18 and 19 are carried respectively by shafts 18' and 19', and the sprocket chains such as chain 30 pass over the rollers just referred to and over sprocket wheels mounted near the end portions of the machine and carried by shafts 32 and 33. The sprocket wheel at the left of Figure 3 is designated 34, and that at the right of the same view is shown at 35.

The shafts 32 and 33 are each mounted in a suitable manner, and in the present instance I have shown the shaft at the right mounted in the element 14, and the shaft at the left mounted in a bearing block 38 slidable in the slotted portion 39 of longitudinal frame extension 40. A screw 41 entering the block 38 carries a hand wheel 42, and the tension of the chains may be adjusted by said element 42, in an obvious manner.

The chains 30 carry forms or size forms designated 45, and these may be spaced as shown, and are applied to the full length of the chains, so that the hot sheet glass delivered to the forms in any suitable manner passes beneath the rotary cutting means, for the purpose of producing sheets in various sizes according to the proportions of those parts directly affecting the cuts to be made.

The forms 45 may each comprise relatively movable sections pivotally mounted at 46' or hingedly connected in any manner known to those skilled in this art, so that the forms may follow the curvature of the rotary devices at the ends of the machine. The forms may be secured to the chains by means of ears 48, or in any suitable manner.

The drive for the machine is thru belt 50 passing over sheave 51 on shaft 33, and this shaft carries a gear wheel 52 meshing with gear wheel 53 on a short shaft 54 which mounts a sprocket wheel at 55, the latter engaging a chain 56 imparting drive to a sprocket wheel at 57, the latter being on shaft 23 of the rotary cutting means.

What is claimed is:

In a machine of the class described, a plurality of traveling devices, forming elements carried thereby, rollers mounted beneath the upper run of the traveling devices, means for imparting movement to said traveling devices, rotary glass cutting means including connected and intersecting longitudinal and circumferential cutting elements, said cutting means being mounted above the rollers and above said upper run, and means for imparting movement to the cutting means.

In testimony whereof I affix my signature.

WILLIAM H. CLELLAND.